Oct. 22, 1968  G. SOTEROPULOS  3,406,840
AGRICULTURAL BALE HANDLING MACHINE
Filed July 21, 1967  2 Sheets-Sheet 1
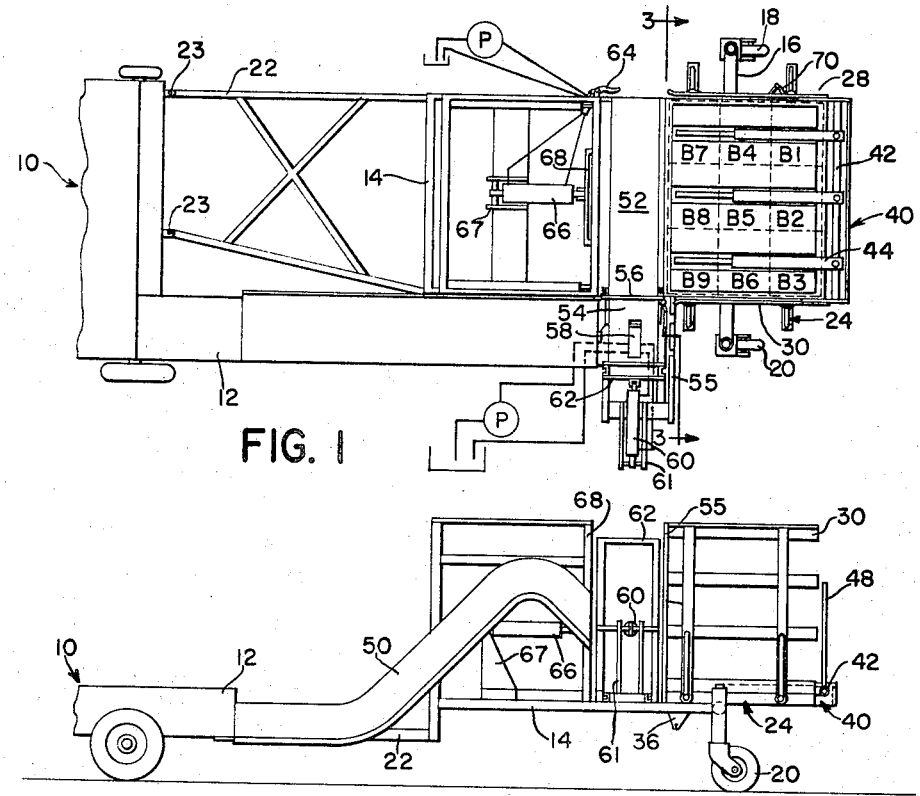
FIG. 1
FIG. 2
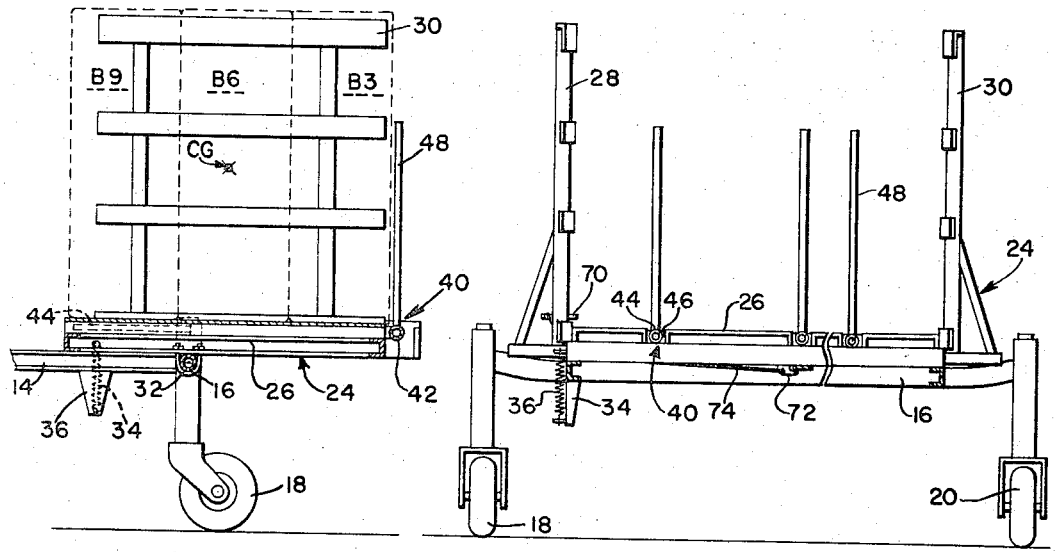
FIG. 4
FIG. 3
INVENTOR.
G. SOTEROPULOS

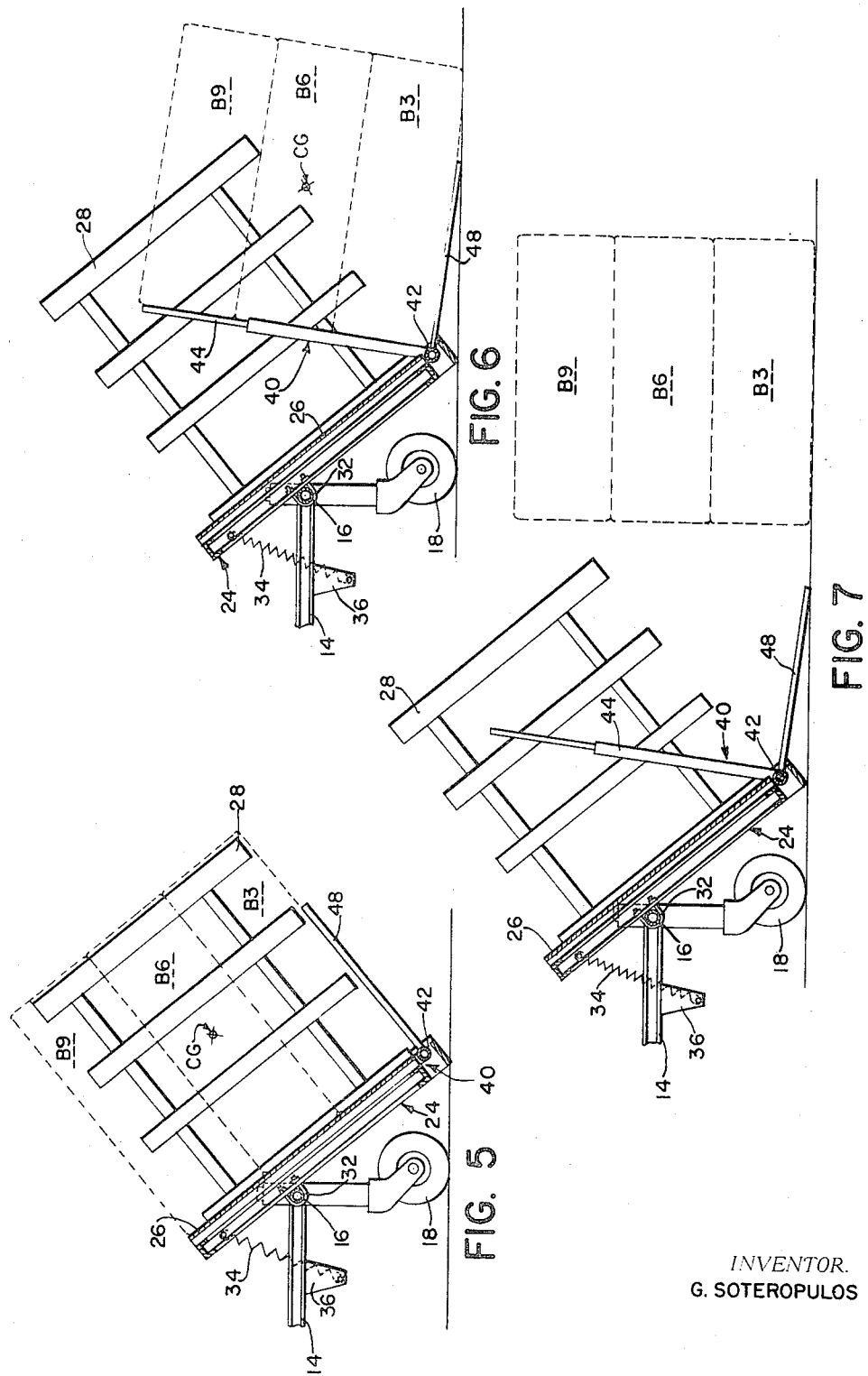

United States Patent Office

3,406,840
Patented Oct. 22, 1968

3,406,840
AGRICULTURAL BALE HANDLING MACHINE
Gust Soteropulos, Ottumwa, Iowa, assignor to Deere & Company, Moline, Ill., a corporation of Delaware
Filed July 21, 1967, Ser. No. 655,037
6 Claims. (Cl. 214—6)

ABSTRACT OF THE DISCLOSURE

A bale grouping machine having a mobile frame towable by an agricultural baling machine, a body tiltable on the frame on a transverse pivot, a deck tiltable on the body about a transverse pivot at the rear of the body, and a hydraulically actuated mechanism for receiving bales from the baling machine and automatically accumulating the bales on the deck in an upright side-by-side relationship until a predetermined group has accumulated, whereupon the weight of the bales tips both the body and the deck about their pivots to deposit the bales on their side in a vertical stack.

Background of the invention

This invention relates to a machine for receiving bales from a conventional agricultural baler, accumulating the bales in a group, and depositing the group of bales on the ground.

It is known to provide a machine for trailing attachment to a conventional agricultural baler having a rearwardly extending discharge to receive successive bales as they are discharged from the baler, to accumulate the bales in a group, and discharge the grouped bales on the ground. It is also known to provide such a machine with means for automatically accumulating the bales in a predetermined group and automatically discharging the bales when the predetermined group is formed. Such a machine is shown in U.S. Patent No. 3,272,352, wherein the bales are accumulated standing on their ends in a side-by-side relationship and automatically discharged when a predetermined group has accumulated by utilizing the weight of the bales to tilt the floor of the machine, so that the bales slide off in successive rows as the machine advances and are deposited shingle fashion on the ground. However, the manner in which the bales are deposited on the ground makes later collection of the grouped bales by mechanical means, such as a forklift, difficult, if not impossible. While other machines, such as self-loading and unloading wagons, have utilized a tilting floor to discharge accumulated bales in an upright stack, such machines have been operated separately from the baler and generally have discharged the bale stack while stationary. In addition, such machines have required hydraulic cylinders or the like to accomplish the tilting of the floor rather than the weight of the bales, resulting in a more expensive and complicated machine.

Summary of the invention

According to the present invention, an improved machine is provided for trailing attachment to an agricultural baling machine for receiving the bales from the baling machine, automatically accumulating them on their ends in a side-by-side relationship until a predetermined group is formed, and then automatically depositing them in an upright stack with the bales lying on their side in a fore-and-aft direction.

An important feature of the invention resides in the use of a normally horizontal body tiltable on the frame of the machine about a transverse axis to a downwardly and rearwardly inclined position and a deck, which receives the accumulated bales and is mounted on the body for tilting about the transverse axis to a generally upright position to deposit the bales in an upright stack on the ground.

Another feature of the invention is that both the body and the deck are tilted to discharge the accumulated bales by the weight of the bales and are automatically returned to their normal position after the bales are discharged, without the use of any external force. Still another feature of the invention resides in the fact that the body and deck are rapidly tilted to quickly discharge the bales, so that the bales will be formed in an upright stack even when the machine is moving at usual baler operating speeds.

Brief description of the drawings

FIG. 1 is a plan view of the bale handling machine in an operative relationship with a typical agricultural baler, only the rear portion of which is illustrated, the machine's hydraulic system being schematically illustrated.

FIG. 2 is a side elevation view of the machine shown in FIG. 1.

FIG. 3 is an enlarged transverse section of the machine viewed along the line 3—3 of FIG. 1 and with a central portion of the machine omitted.

FIG. 4 is a fragmentary enlarged side elevation view of the rearward portion of the machine in its bale collecting or receiving position, immediately prior to the discharge of a group of bales which are shown in dotted lines.

FIG. 5 is a view similar to FIG. 4 but showing the machine in the initial phase of its dumping operation.

FIG. 6 is similar to FIG. 5 but showing the machine at a later phase of the dumping operation.

FIG. 7 is similar to FIG. 6, but showing the machine after the dumping operation has been completed but before the machine has returned to its bale collecting position.

Description of the preferred embodiment

The numeral 10 represents the rear portion of a typical agricultural baler having a rearwardly extending bale outlet 12, the term "rearwardly" as well as such terms as "forwardly," "right" and "left" being with reference to a person facing the direction of advance over the field. As is well known in the art, a conventional agricultural baler advances over a field of wind-rowed crop, such as hay or the like, picking up the crop as it advances and forming the crop into bales, which are successively discharged in a rearward direction from the bale outlet 12, the bales conventionally being of uniform size and in the shape of an elongated rectangular prism, the bales extending in a fore-and-aft direction as they are discharged from the outlet 12.

Attached to and trailing the baler 10 is the bale grouper or accumulator having a mobile main frame 14, which includes a transverse tubular support member near its rearward end, right and left caster wheels 18 and 20 respectively being mounted at the opposite ends of the tubular support members 16. The frame 14 also includes a forwardly extending hitch or draft member 22, the forward end of which is attached to the rearward portion of the baler 10 at two laterally spaced points 23. The duel attaching points of the rigid draft member 22 and the caster type wheels 18 and 20 causes the trailing bale accumulator to be rigid with the baler so that it maintains the same relationship with the baler at all times as distinguished from an articulated type connection.

Mounted on the rearward portion of the main frame 14 is a tiltable body, indicated in its entirety by the numeral 24 and having a normally horizontal floor 26 and opposite upright side walls or members 28 and 30 respectively extending upwardly from the opposite sides of the floor 26. The body 24 is tiltable about a transverse pivot formed by the tubular support member 16, the body being mounted on the tubular support member 16 by means of a pair of journals 32 depending from the floor 26. Normally the body is maintained with its floor 26 in a horizontal condition, as shown in FIGS. 2, 3 and 4 by means of a helical tension spring 34 having one end attached to the forward end of the body 24 and its opposite end attached to a bracket 36 depending on the main frame 14. The tilt axis of the body is forward of the fore-and-aft center of gravity of the body, so that without the spring 34, which biases the body toward the level bale receiving position, the body would tilt rearwardly about its pivot to the position shown in FIGS. 5, 6 and 7.

The generally L-shaped deck, indicated in its entirety by the numeral 40, includes a transverse tubular pivot member 42 journaled at opposite ends at the rearward end of the floor 26, whereby the deck 40 is swingable on the body about the transverse pivot formed by the member 42. The deck 40 includes a plurality of elongated fore-and-aft extending deck members 44 attached at the rearward end to the pivot member 42, the floor 26 of the body having fore-and-aft extending grooves 46 adapted to receive the deck members 44 when the deck is in its forward position with the deck members parallel to the floor as shown in FIGS. 2, 3 and 4. A plurality of tubular retaining members 48 are attached to the member 42 and extend normal to both the member 42 and the deck members 44 and upwardly from the member 42 when the body and deck are in the bale receiving position as shown in FIGS. 2, 3 and 4.

The bales are loaded onto the body and deck when they are in their bale receiving position, as shown in FIGS. 1–4, by a bale loading mechanism, which is substantially similar to the mechanism described in U.S. Patent No. 3,272,352. The bale loading mechanism includes a fore-and-aft extending bale chute 50, the front portion of which is connected in a bale receiving relationship to the bale outlet 12 and inclines upwardly and rearwardly, and the rearward portion of which extends downwardly and rearwardly, so that as successive bales are forced rearwardly from the bale outlet 12 and up the forward portion of the chute 50, they are rotated approximately 90° about a transverse axis at the apex of the bale chute and deposited in an upright condition on their rearward end on a platform 52 mounted on the frame 14. The platform 52 extends the width of the machine and has an extension for a bale receiving area 54 immediately below the outlet of the chute 50, the bale receiving area being approximately the same size as the end of a conventional bale. A retainer structure 55 extends upwardly from the frame rearwardly of the bale receiving area 54 to prevent rearward movement of the bale, while a laterally shiftable retainer 56 prevents lateral tipping of the bale from the bale receiving area.

As each bale is discharged from the bale chute 50, it actuates a treadle 58 on the bale receiving area 54 and the treadle in turn actuates a control valve (not shown) mounted beneath the treadle to pressurize and actuate a hydraulic cylinder 60 operative between a frame extension 61 and laterally shiftable pusher 62. Actuation of the cylinder moves the pusher 62 the width of one bale, so that the bale resting on the bale receiving area 54 is laterally shifted on the platform 52 off of the bale receiving area. The source of fluid pressure and the associated reservoir are schematically illustrated in FIG. 1, and together with the control valve actuated by the treadle 58 form a conventional hydraulic system for the actuation of a cylinder, the source of fluid pressure advantageously being located on the agricultural tractor, which typically is used to tow the baler 10.

After the first bale is shifted from the treadle 58, the valve permits the retraction of the cylinder to the position shown in FIG. 1, so that the bale receiving area is adapted to receive the next bale from the bale chute 50. When the succeeding bale is discharged from the bale chute, the above cycle is repeated so that two bales are deposited in a side-by-side relationship on the platform 52.

When the third bale is deposited on the bale receiving area and then laterally shifted on the platform 52, the first bale reaches the right-hand end of the platform and actuates a trip 64. Like the treadle 58, the trip 64 has an associated control valve (not shown) which is located in a hydraulic circuit so that actuation of the trip actuates the valve to pressurize a cylinder 66, the hydraulic circuit again being schematically illustrated in FIG. 1 and advantageously utilizing the same source of fluid pressure as the previously described circuit. The cylinder 66 extends in a fore-and-aft direction and has its forward end attached to an upright frame member 67 rigidly mounted on the frame 14 and its rearward end connected to a pusher frame 68, which spans the three bales on the platform. Actuation of the cylinder 66, and the pusher shiftable thereby, moves the three bales rearwardly off the platform and onto the forward portion of the body 24 and deck 40, the pusher 68 shifting the bales approximately the same distance as the fore-and-aft dimension of the bales, so that the first three bales respectively occupy the positions identified by B7, B8 and B9 in FIG. 1, wherein the outlines of the bales are shown in dotted lines.

After the first row of bales is shifted rearwardly, the trip 64 returns to its normal position, permitting the exhaust of the cylinder 66 and retraction of the pusher 68 into the position shown in FIG. 1. The fourth bale discharged from the bale chute will then be shifted onto the platform 52 to become the first bale in a new row, and, like the previous row, after three bales are accumulated on the platform 52, the trip 64 will then again be actuated, pressurizing the cylinder 66 so that the second row of bales is shifted rearwardly to occupy the position formerly held by the first row of bales, which then occupies the position identified by B4, B5 and B6 in FIG. 1.

Similarly, the seventh, eighth and ninth bales are formed into a third row, following which, the pusher 68 moves the third row of bales rearwardly to the position previously occupied by the second row of bales, so that the nine successive bales will occupy the respective positions identified by the labels B1 through B9 in FIG. 1.

As all nine bales are shifted rearwardly to the position shown in FIG. 1, the first bale B1 engages an arm 70, shifting the arm 70 rearwardly and to the right, movement of the arm actuating a latch 72 through the connecting cable 74. The latch 72 is mounted on the floor of the body 24 and is engageable with the frame 14 to lock the body to the frame in its level condition as shown in FIGS. 1–4. The release of the latch 72, when the first bale in its ultimate position shown in FIG. 1, permits the body 24 to tilt downwardly and rearwardly about the pivot 16. As previously described, when the body 24 is unloaded, the spring 34 maintains the body in its level condition. However, as best seen in FIG. 4, the fore-and-aft center of gravity of the body when loaded with bales is rearwardly of the pivot 16, the center of gravity being identified by the letters CG in FIGS. 4, 5 and 6. Since the center of gravity is rearwardly of the pivot 16, a moment is created on the body 24 which tends to rotate the body in a clockwise direction about the pivot 16, as viewed in FIG. 4, the moment being sufficient to overcome the biasing effect of the spring 34 when the weight of the bales is added to the weight of the body, although the weight of the body alone is not sufficient.

As shown in FIG. 5, the body 24 tilts downwardly and rearwardly until its rearward edge engages the ground. At this point, the bales will not slide off the body since they are resting on the deck 40, and the retaining members 48 on the deck prevent the sliding of the bales. However, in this position the center of gravity of the bales is slightly to the rear of the deck pivot 42, creating a clockwise moment on the deck as seen in FIG. 5, and since the deck 40 is unrestrained, it will swing rearwardly about the pivot 42 until the end of the retaining members 48 engage the ground, as shown in FIG. 6. Since the members 48 are shorter than the bales, the rearward portion of the first row of bales will engage the ground, and the friction between the bales and the ground will pull the first row of bales off the retaining members 48, with the succeeding rows of bales being carried off the deck with the first row to form an upright stack of bales with the bales laying on their sides and extending in a fore-and-aft direction as shown in FIG. 7.

After the bales are discharged, removing the added weight from the body 24, the spring 34 is sufficiently strong to pull the forward end of the body downwardly until it is again in its level condition, the latch 72 again locking the body to the frame. The retaining members 48 engage the rearward portion of the body 24 to prevent additional rearward tilting of the deck 40 relative to the body 24, so that as the body 24 returns to its horizontal or bale receiving position, the weight of the deck will cause it to swing forwardly until the deck members 44 are again received in the floor slots 46.

In operation, after the group of bales are accumulated and dumped, as described in detail above, and the body and deck returned to their bale receiving or accumulating position shown in FIGS. 1–4, the above described accumulating and dumping cycle is repeated.

Thus the bales are deposited at intervals around the field in groups such as the group shown in FIG. 7, with the bales lying on their sides in fore-and-aft orientation in a vertical stack that is one bale deep in a fore-and-aft direction. As is apparent from the above, the bales are rotated 90° about a transverse axis when they are grouped on the accumulator and rotated another 90° about a transverse axis when they are deposited on the ground, so that the side of the ball that was facing upwardly as the bale left the bale outlet 12 is facing downwardly when it is deposited on the ground, the right side of the bale, which is conventionally the cut side of the bale, remaining on the right side in the stack of bales. Since the cut side of the bales are not facing upwardly, the bale stack will have desirable water shedding characteristics.

Although each stack or group of bales in the illustrated embodiment is formed with only nine bales, the body and deck of the machine could be made both longer and wider so that a larger number of rows could be accumulated with a larger number of bales in each row. Thus, a wide variety of sizes and shapes of bale groups could be provided according to the width and length of the body and deck. However, the width of the machine is limited to a size which would not interfere with the crop in the adjacent windrow, and if the number of rows in each group is too great, the height of the group deposited on the ground will cause it to be unstable.

The grouping of the bales in the field in uniform and solid stacks having a regular configuration facilitates subsequent loading of the bales by mechanical means such as grapples or forklifts for transport of the crop from the field.

I claim:

1. A bale handling machine comprising: a mobile main frame adapted for connection to and travel with an agricultural baler having a bale outlet; a body having a floor with front and rear ends; means mounting the body on the frame for rocking about a transverse axis between a first position wherein the floor is generally level and a second position wherein the floor is inclined downwardly and rearwardly; a deck having front and rear ends; means mounting the deck on the body for rocking about a transverse axis proximate to the rear end of the deck between a bale receiving position wherein the deck is generally parallel to the floor and a bale discharge position wherein the deck is generally upright; means operative to transfer bales successively from the bale outlet onto the deck when the deck is in its bale receiving position; dump means responsive to a predetermined accumulation of bales on the deck for tilting the body to its second position and the deck to its bale discharge position to deliver the bales to the ground and return the body to its first position and the deck to its bale receiving position after discharge of the bales; and retaining means associated with the rearward end of the deck for retaining the bales on said deck until the deck reaches its bale discharge position.

2. The invention defined in claim 1 wherein the retaining means comprises at least one member attached to and extending upwardly from the rear end of the deck when the deck is in its bale receiving position and extending rearwardly from the deck when it is in its bale discharging position.

3. The invention defined in claim 1 wherein the means mounting the body on the frame includes a transverse pivot mounted on the frame proximate to its rearward edge, the pivot being spaced a lesser distance above the ground than from the rearward end of the body so that the rearward end of the body engages the ground in said second position, and the means mounting the deck on the body includes a transverse pivot supported on the rearward end of the body.

4. The invention defined in claim 1 wherein the dump means includes a spring means operative between the frame and the body to bias the body towards its first position, and the gravity effect of said predetermined accumulation of bales overcomes the biasing force of the spring to shift the body to its second position and the deck to its bale discharge position.

5. The invention defined in claim 2 wherein the bale transfer means includes a bale turning means operative to receive successive bales and deposit them in an on-end position on the frame, a first shift means on the frame and cyclically operative to shift successive bales from the bale turning means laterally on the frame to form a transverse row of laterally abutting bales, and second shift means on the frame and cyclically operative in response to the formation of a row of predetermined length to shift successive rows of bales rearwardly onto the deck to accumulate the bales on the deck in an on-end condition in a plurality of transverse rows in a fore-and-aft abutting relationship.

6. The invention defined in claim 5 wherein the dump means includes a locking means operative between the body and the frame to releasably lock the body in its first position and actuatable in response to the accumulation of a predetermined number of bale rows to permit the body to swing to its second position in response to the weight of the bales accumulated on the deck, the weight of said accumulated bales shifting the deck into its bale discharge position after the body has shifted to its second position, delivering the rearward row of bales to the ground with the bales in a transverse row in a side-by-side relationship and succeeding rows of bales on top of and in vertical alignment with said row with the bales in the same relationship.

References Cited

UNITED STATES PATENTS

| | | |
|---|---|---|
| 2,828,031 | 3/1958 | Babcock et al. |
| 2,848,127 | 8/1958 | Grey. |
| 3,013,682 | 12/1961 | Unruh. |
| 3,251,485 | 5/1966 | Fancher _____ 214—6 |
| 3,261,482 | 7/1966 | Tate _____ 214—6 |
| 3,272,352 | 9/1966 | Adams et al. _____ 214—7 |
| 3,308,978 | 3/1967 | Smith _____ 214—511 |

GERALD M. FORLENZA, *Primary Examiner.*

R. J. SPAR, *Assistant Examiner.*